United States Patent [19]
Shouman

[11] Patent Number: 5,642,613
[45] Date of Patent: Jul. 1, 1997

[54] COMBUSTION METHOD FOR POWER GENERATION

[76] Inventor: Ahmad R. Shouman, 1006 Bloomdale Dr., Las Cruces, N.M. 88005

[21] Appl. No.: 600,161

[22] Filed: Feb. 12, 1996

Related U.S. Application Data

[62] Division of Ser. No. 216,021, Mar. 21, 1994, Pat. No. 5,491,968.

[51] Int. Cl.⁶ ............................................. F02C 3/28
[52] U.S. Cl. ...................... 60/39.05; 60/39.12; 48/197 R
[58] Field of Search ............................ 60/39.05, 39.12, 60/39.53, 39.55, 39.56, 35.57; 48/197 R

[56] References Cited

U.S. PATENT DOCUMENTS

| | | |
|---|---|---|
| 2,944,396 | 7/1960 | Barton et al. ............... 60/39.05 |
| 3,986,955 | 10/1976 | Plicque . |
| 4,053,404 | 10/1977 | Van Kirk . |
| 4,100,730 | 7/1978 | Pradt ............................ 60/39.05 |
| 4,158,145 | 6/1979 | Kartsounes et al. ............ 290/52 |
| 4,240,784 | 12/1980 | Dauvergne . |
| 4,384,959 | 5/1983 | Bauer et al. . |
| 4,670,162 | 6/1987 | Robey . |
| 4,700,637 | 10/1987 | McCartney . |
| 4,721,575 | 1/1988 | Binning et al. . |
| 4,829,911 | 5/1989 | Nielson . |
| 4,841,721 | 6/1989 | Patton et al. . |
| 5,215,455 | 6/1993 | Dykema . |
| 5,271,729 | 12/1993 | Gensler et al. . |

*Primary Examiner*—Louis J. Casaregola
*Attorney, Agent, or Firm*—Sixbey, Friedman, Leedom & Ferguson, P.C.; Joan K. Lawrence

[57] ABSTRACT

A power generating combustion system and method are provided with a first stage combustion system that may include a wet oxidation reactor or a direct contact boiler and a second stage combustor including a stoichiometric burner to produce the substantially complete combustion of a wide range of fuels and mixtures of fuels to produce combustion products usable in generating power. The system design temperatures and pressures allow the substantially complete combustion of garbage, municipal and industrial waste and low quality fuels to generate power.

2 Claims, 4 Drawing Sheets

COMBUSTION METHOD FOR POWER GENERATION

This is a Divisional application of Ser. No. 08/216,021, filed Mar. 21, 1994 (U.S. Pat. No. 5,491,968).

Technical Field

The present invention relates generally to combustion systems and specifically to a combustion system and method, particularly one incorporating a wet oxidation reactor or direct contact boiler, capable of combusting a wide range of types of fuels and fuel mixtures to generate power without producing toxic or polluting power plant efflux.

BACKGROUND OF THE INVENTION

The complete combustion of fuel, especially fuel from such diverse and low quality sources as low grade fuels and municipal and industrial waste, to generate usable power without concomitantly creating environmental problems has remained an elusive goal yet to be fully achieved. Low grade fuels tend to contain high amounts of sulfur and produce the sulfur oxides implicated in acid rain when they are burned in power plants. Municipal and industrial waste has traditionally been disposed of in landfills. However, not only is there an acute shortage of landfill areas, but burying this waste has been demonstrated to contaminate the surrounding soil and adjacent ground water with toxic substances. Some industrial waste, such as that containing low level radiation, for example, is particularly hazardous and difficult to dispose of without creating environmental or health problems.

Many industrial plants and communities have resorted to burning their wastes. Although recycling programs have produced some reductions in the quantity of municipal and industrial waste to be disposed of, a vast quantity of such waste still remains to be disposed of by burning or otherwise. The burning or incineration of waste presents many serious problems. Existing incineration plants inevitably discharge pollutants in excess of clean air standards, despite efforts to minimize the discharge of these pollutants by the use of scrubbers, filters and electrostatic precipitators. Moreover, the incineration process generates toxic ash, which must be disposed of.

The waste management industry has employed wet oxidation reactors for the combustion of organic wastes, including those generated by garbage, pulp and paper operations and milk processing, to produce mainly carbon dioxide and water. A typical process introduces a waste stream and air to a reactor at high temperature and pressure, which results in the oxidation of the organic matter in the waste stream in an exothermic reaction that may generate usable heat if the reaction is controlled. Low grade solid fuels may also be burned in a wet oxidation reactor. The careful control and monitoring required for wet oxidation reactors has been one of their major disadvantages. In addition, the available wet oxidation reactors are thermally inefficient and do not produce substantially complete combustion of the organic wastes or fuel. U.S. Pat. Nos. 4,053,404 to Van Kirk; 4,384,959 to Bauer et at.; 4,670,162 to Robey; and 4,721,575 to Binning et at. are illustrative of prior art wet oxidation reactors and wet oxidation reaction processes.

The prior art has proposed combustion systems for municipal waste, coal, and the like which permit the recovery of valuable resources and produce energy useful for power generation or in a heat exchanger. U.S. Pat. Nos. 3,986,955 to Plique and 4,829,911 to Nielson are exemplary of such systems. These systems, however, are not thermally efficient because the wet oxidation process provides the only combustion system and is not properly controlled to effect complete combustion. As a result, the maximum operating temperatures are not likely to be high enough to allow substantially complete combustion of the organic reactants or to generate usable energy.

The inclusion of additional combustion stages in various combustion processes to effect the substantially complete combustion of hydrocarbon fuels has been proposed in U.S. Pat. Nos. 4,240,784 to Dauvergne; 5,215,455 to Dykema and 5,271,729 to Gensler et at. However, none of these patents suggests improving the combustion conditions in a wet oxidation reactor or direct contact boiler with additional combustion stages to enhance the thermal efficiency of the combustion of varied mixtures of organic waste materials and low quality fuel.

U.S. Pat. No. 4,700,637 to McCartney discloses a two stage combustion or incineration process for the substantially complete combustion of low level radiation waste which includes the addition of a supplemental conventional fuel and air in excess of that required for stoichiometric combustion. Although it is disclosed that liquid waste can be processed by this system, it is essentially a dry incineration process, and there is no suggestion that it could be used in connection with a wet oxidation process or direct contact boiler to produce usable power at enhanced thermal efficiency while producing clean, nonpolluting efflux.

The prior art, therefore, has failed to provide a combustion system employing a wet oxidation reactor or a direct contact boiler and a stoichiometric second stage burner which promotes the substantially complete combustion of a range of organic materials from municipal waste to low quality fuels at a thermal efficiency which produces usable energy for power generation without producing undesirable environmental pollutants. A need exists for such a combustion system.

SUMMARY OF THE INVENTION

It is a primary object of the present invention, therefore, to overcome the disadvantages of the prior art and to provide a high thermal efficiency combustion system including a wet oxidation reactor or a direct contact boiler that produces the substantially complete combustion of low quality fuels to generate power without generating undesirable environmental pollutants.

It is another object of the present invention to provide a combustion system which produces the optimum thermodynamic state of the gaseous products of combustion supplied for power generation.

It is a further object of the present invention to provide a combustion system which allows the use of different kinds of low quality fuels or a mixture of different low quality fuels.

It is yet another object to provide a combustion system including a stoichiometric second stage combustor to produce an optimum desired design temperature and pressure.

It is yet a further object of the present invention to provide a method for producing combustion products usable for power generation from solid waste low quality fuels.

The aforesaid objects are achieved by providing a power generating combustion system and method which substantially completely combusts a wide variety of different types and mixtures of fuel including a first stage combustion means for burning a selected fuel in the presence of air and liquid at a predetermined design pressure and temperature and a second stage stoichiometric combustion means for insuring substantially complete combustion of the selected fuel to produce a desired final temperature of the combustion products. The first stage combustion means is preferably a wet oxidation reactor or a direct contact boiler. The second stage combustion means is a stoichiometric burner and may be positioned in different locations and system configurations relative to the first stage combustion means. Low quality organic fuels, including municipal and industrial waste, may be burned by the combustion system and method of the present invention to generate usable power without producing undesirable environmental pollutants or toxic byproducts.

Other objects and advantages will be apparent from the following description, claims and drawings.

DESCRIPTION OF THE PREFERRED EMBODIMENTS

The combustion system of the present invention can be employed to convert low quality fuels and organic waste products, such as those which make up municipal and industrial byproducts and garbage, that otherwise create disposal problems to gaseous products useful for the production of power in a power generating plant. These organic wastes and other, more conventional, fuels undergo substantially complete combustion in the combustion system of the present invention so that clean, nonpolluting effux is produced by the power plant and emissions exceed EPA requirements.

The combustion system of the present invention is a highly thermally efficient system. Therefore, it is ideally suited for use with power plants seeking to achieve very high thermal efficiency. One type of power plant for which the present combustion system is especially well suited is the power plant based on a direct contact steam boiler described in U.S. Pat. No. 4,841,721 to Patton and Shouman, the inventor herein. The disclosure of U.S. Pat. No. 4,841,721 is hereby incorporated herein by reference.

The combustion system of the present invention employs two combustion stages to substantially completely combust the organic waste or other fuel burned in the system. The first combustion stage in the system may be a wet oxidation reactor. The wet oxidation process allows the oxidation of organic materials mixed with either air or oxygen in the presence of liquid water. As the temperature of the water, which is typically a water bath in a wet oxidation reactor, is increased, the necessary reaction residence time decreases significantly. Potential pollutants are absorbed by the water bath in a form that can be disposed of. However, the maximum temperature that can be produced in a wet oxidation reactor is limited to the saturation temperature of the steam corresponding to the partial pressure of the steam present in gaseous products of combustion. Because this maximum temperature is relatively low, the potential thermal efficiency of a power plant using a wet oxidation process as the only combustion system would also be relatively low.

The present invention allows the production of higher temperatures than those permitted by the wet oxidation process alone. A second combustion stage is added downstream of the first stage wet oxidation reactor. This is a stoichiometric combustion burner that uses an appropriate fuel to produce the maximum temperature tolerated by the material from which the power plant prime mover is constructed. The products of combustion of the stoichiometric second stage burner mix directly with the gaseous products of the wet oxidation reactor to produce the predetermined desired temperature, which, in turn, allows the highest achievable thermal power plant efficiency to be reached.

Figure 1:
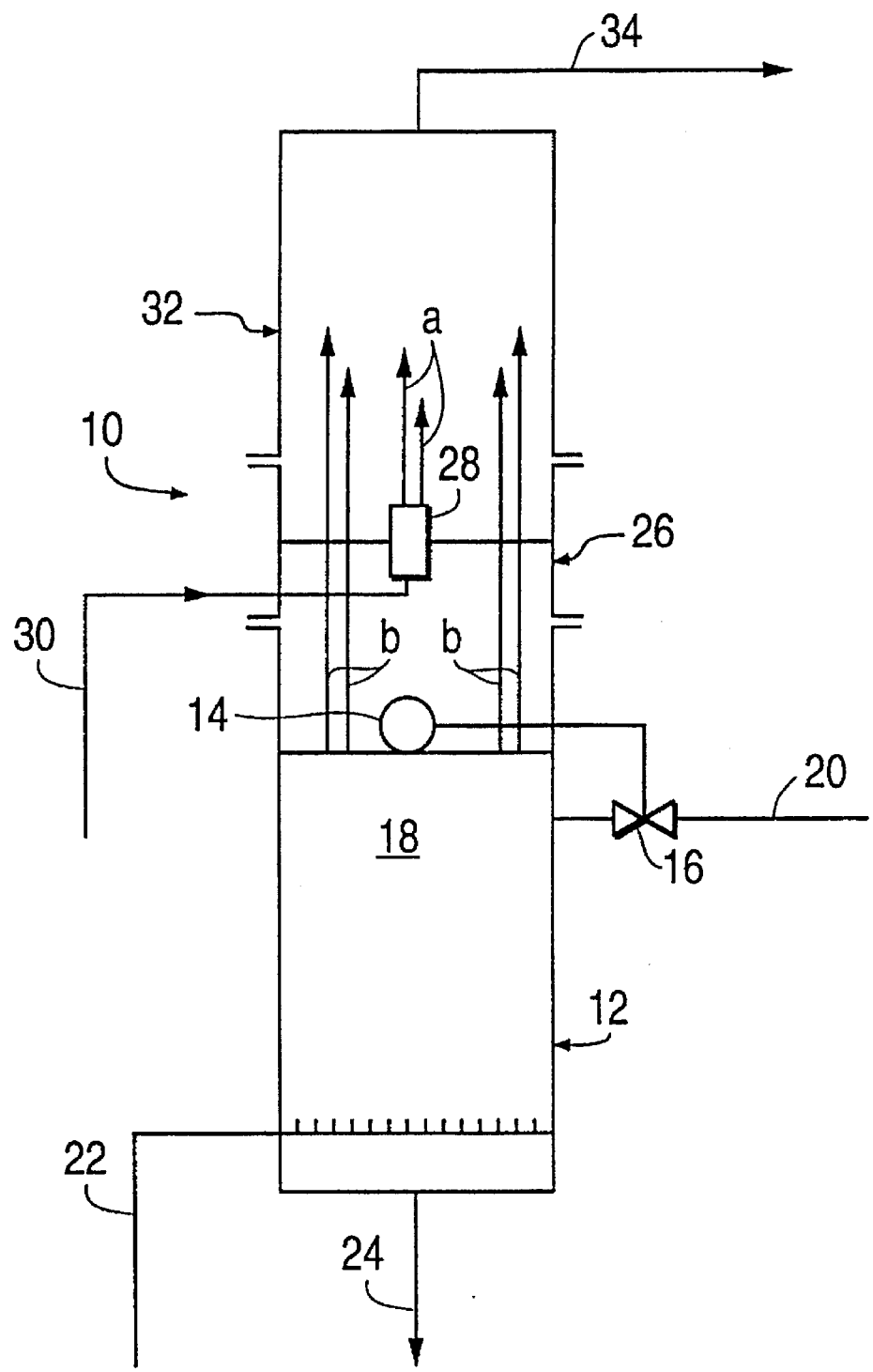
FIG. 1 is a schematic diagram of a first embodiment of a combustion system according to the present invention including a first stage wet oxidation reactor.

Referring to the drawings, FIG. 1 presents a schematic diagram of one embodiment of a combustion system 10 according to the present invention. This embodiment of the combustion system 10 includes a first stage wet oxidation reactor 12, which generally has a cylindrical configuration with the diameter and height approximately sized for the power plant with which the combustion system will be used. The reactor 12 includes a float 14 which controls a valve 16 so that a constant level of liquid 18 is maintained in the reactor 12. A mixture of fuel and water of the appropriate proportions for the type of fuel and the system is supplied to the reactor 12 through line 20 at the design pressure and temperature of the system. The float controlled valve 16 regulates fuel and water flow into the reactor 12. Air or oxygen is supplied to the reactor 12 through line 22 at the design pressure and temperature of the system. The design temperature and pressure will depend, in part, on such factors as the size of the reactor, the materials from which the system is constructed and the thermal efficiency desired. Illustrative design temperatures and pressures are described in more detail hereinbelow.

A potion of the liquid in the reactor 12 is blown off through line 24 as required to maintain the quality of the mixture in the reactor.

The combustion system embodiment shown in FIG. 1 also includes a second section 26 downstream of the wet oxidation reactor 12. A second stage stoichiometric combustor or burner 28 is mounted within the combustion system second section 26. A stoichiometric mixture of a second fuel and air or oxygen is supplied to the second stage burner 28 through line 30 at the system design pressure and temperature.

A third section 32, which is a mixing section, is located downstream of the second section 26. In the third section the proper mixing of the hot products of combustion from the burner 28 (arrows a) with the cooler gases leaving the wet oxidation reactor (arrows b) occurs. The final gaseous products of the combustion system leave the system through line 34 and are then supplied to the inlet of a power plant or directly to a power plant prime mover (not shown).

The wet oxidation reactor 12, the burner mounting section 26 and the mixing section 32 are preferably constructed of two layers of material so that the system will be able to reach the desired design temperature and pressure. The interior layer of the reactor must be capable of withstanding high temperatures, while the exterior layer is not required to withstand high temperatures, but must be able to withstand the system design pressures. Consequently, the interior layer may be formed of a low cost refractory material, such as, for example, clay. However, ceramics such as silicon nitride ($Si_3N_4$) and silicon carbide (SiC) are preferred for this purpose. The exterior of the reactor 12 and added sections 26 and 32, may be constructed of a suitable composite material like steel. The ability to use these materials for the combustion system of the present invention eliminates the need for such high temperature, expensive materials as titanium, which has made the construction of municipal and industrial waste combustion systems prohibitively expensive. A major advantage of the combustion system of the present invention is its significantly lower cost as compared to available organic waste and low quality fuel combustion systems.

Figure 2:
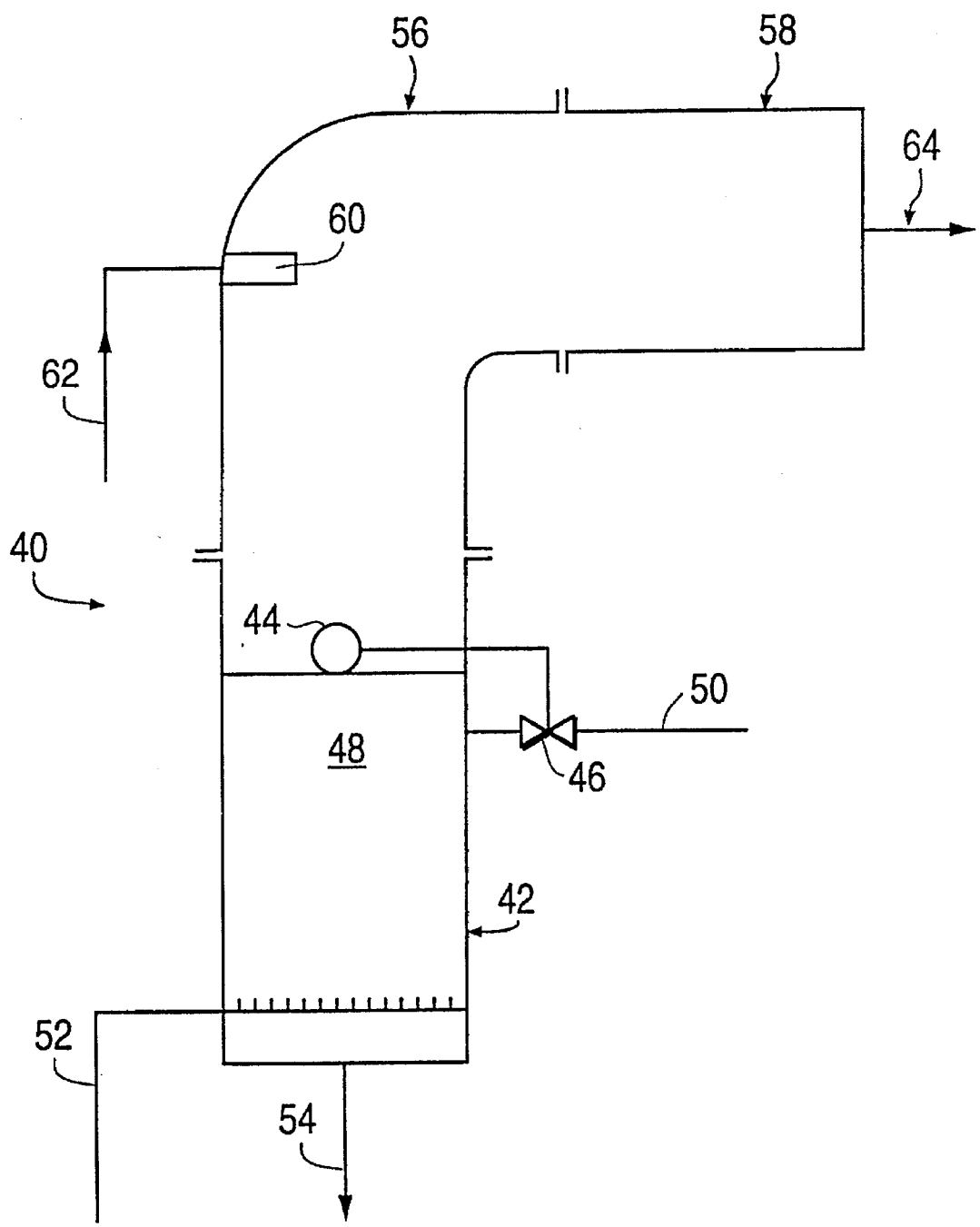
FIG. 2 is a schematic diagram of a second embodiment of a combustion system according to the present invention including a first stage wet oxidation reactor.
Figure 3:
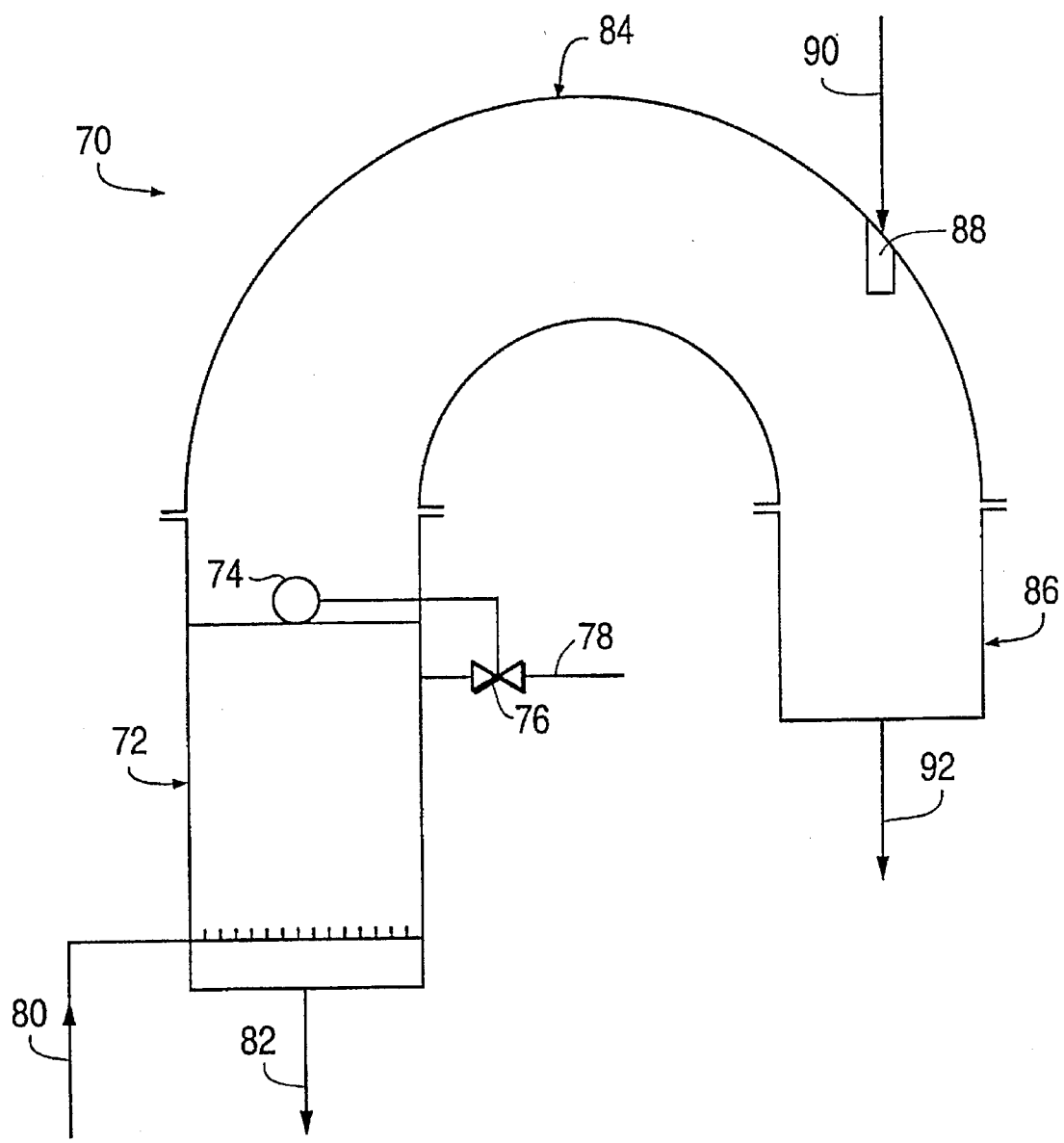
FIG. 3 is a schematic diagram of a third embodiment of a combustion system according to the present invention including a first stage wet oxidation reactor.

FIGS. 2 and 3 illustrate two additional embodiments of the combustion system of the present invention which also include wet oxidation reactors. These combustion system embodiments are substantially the same in operation as the FIG. 1 embodiment. However, the configurations of the stoichiometric burner mounting and mixing sections and the locations of the stoichiometric burners relative to the wet oxidation reactor are different. These different configurations allow the present combustion system to be used with different power plant configurations.

FIG. 2 illustrates a second embodiment of the present combustion system. The wet oxidation reactor 42 includes a float 44 which controls a valve 46 to maintain a constant level of liquid 48 in the reactor 42. The proper water and fuel mixture is supplied to the reactor 42 through line 50, and air or oxygen is supplied to the reactor 42 through line 52. Liquid is drawn off through line 54 as required to maintain the reactor mixture quality. The burner mounting section 56 connects the reactor 42 to the mixing section 58, which is oriented perpendicularly to the reactor 42. The second stage burner 60 is mounted where the centerline of the mixing section 58 intersects the second burner mounting section 56. Line 62 supplies a stoichiometric mixture of air or oxygen and fuel to the burner 60. Line 64 carries the gaseous mixture produced by the two combustion stages (not shown) to the power plant.

FIG. 3 illustrates a third embodiment 70 of the present combustion system. This embodiment provides a third system configuration. A wet oxidation reactor 72 includes the same float 74 and valve 76 components as the other embodiments. Line 78 supplies a fuel and water mixture, line 80 supplies air or oxygen and line 82 allows liquid to be drawn out of the reactor 72. The burner mounting second section 84 is in the shape of a 180° elbow which connects the downcomer third or mixing section 86 to the wet oxidation reactor 72. The second stage combustion burner 88 is mounted where the centerline of mixing section 86 intersects the second section 84. Line 90 supplies a stoichiometric mixture of fuel and air or oxygen to the burner 88, and the mixed gaseous combustion products exit the system by line 92.

Figure 4:
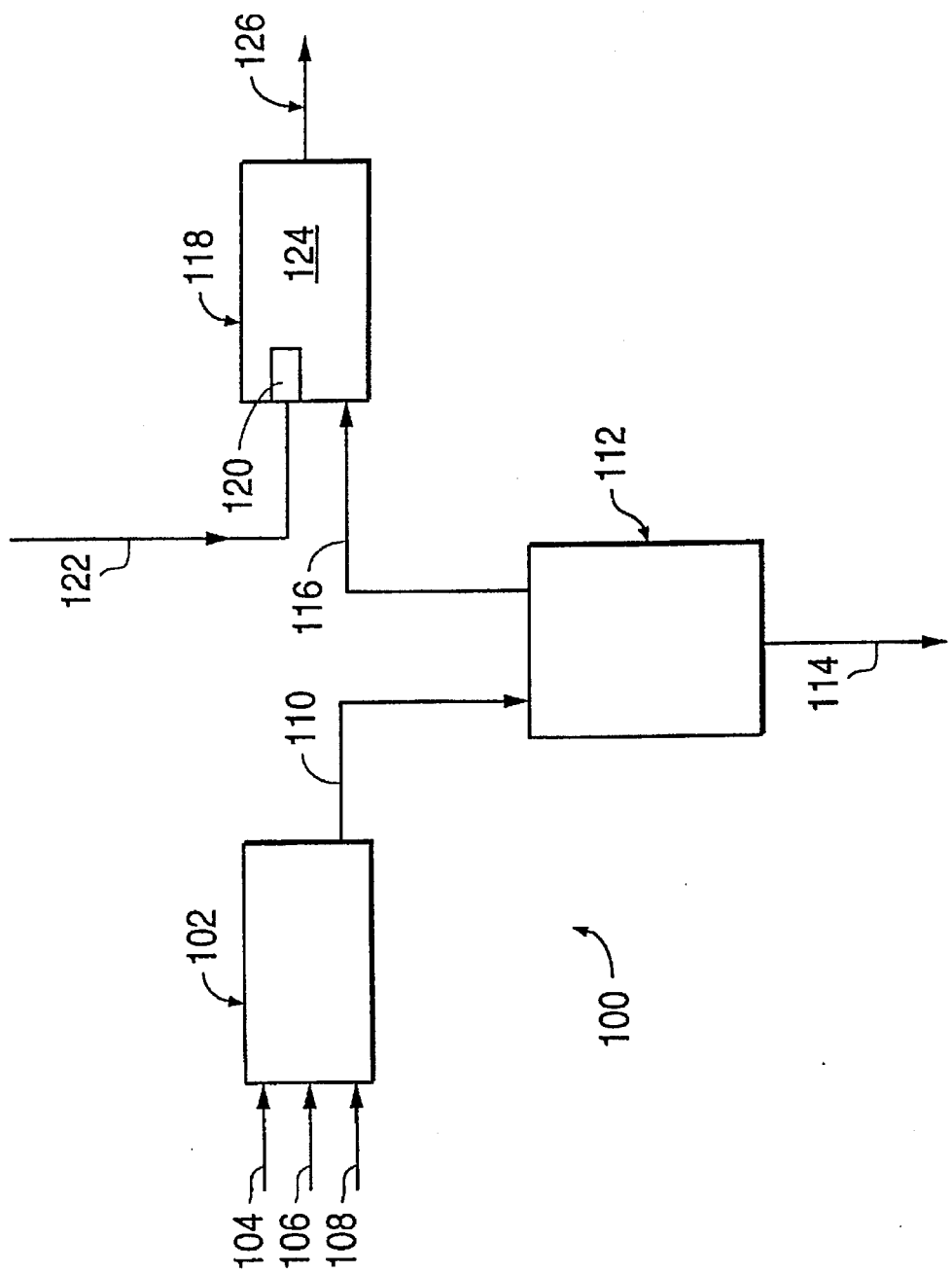
FIG. 4 is a schematic diagram of a fourth embodiment of a combustion system according to the present invention including a first stage direct contact boiler.

FIG. 4 illustrates yet a fourth embodiment of the combustion system of the present invention. The combustion system 100 shown diagrammatically in FIG. 4 employs a direct contact boiler 102 as a first combustion stage instead of a wet oxidation reactor. This first stage combustion system produces a mixture of wet steam and noncondensible gases. Water, air and fuel are supplied to the boiler through lines 104, 106 and 108, respectively. Moisture laden gases produced by the first stage of combustion are directed from the boiler 102 through line 110 to a separator 112. In the separator 112 the moisture is separated from the gases and leaves the separator through line 114. Moisture-free gas exits the separator through line 116 and enters a second stage combustion area 118. A stoichiometric second stage combuster or burner 120 produces the desired design temperature at the desired design pressure.

An appropriate mixture of fuel and air or oxygen is supplied to the stoichiometric burner 120 through line 122. The flow rate of this fuel and air mixture is controlled to produce the desired final temperature of the gaseous mixture in the second stage mixing section 124. Optimum mixing of the gases from the separator 112 and the combustion products produced by the second stage burner 120 takes place in the mixing section 124 so that the gas exiting the second stage combustion area 118 through line 126 has a substantially uniform temperature. The gases leaving line 126 may be fed directly to the prime mover of a power generating plant.

The boiler 102 and the mixing section 124 are constructed of two layers of construction material. The interior layer, like the interior layer of the FIGS. 1–3 embodiment, is constructed of a material capable of withstanding the desired system temperature. The exterior layer is constructed of a material capable of withstanding the desired system pressure.

The combustion system of the present invention effectively substantially completely combusts a wide range of different types of fuels, from municipal garbage to industrial waste to low quality coal. It is particularly useful for disposing of solid waste so that potentially toxic substances are completely burned and thus converted to nontoxic substances. Any reusable chemicals that are not completely combusted may be extracted from the system and recovered. The liquid drawn off the wet oxidation reactor (line 24 in FIG. 1) could be appropriately treated to recover useful materials. The present combustion system achieves substantially complete combustion so that only minimal ash is produced. This ash, however, is nontoxic and usable and does not require disposal.

The present combustion system achieves substantially complete combustion of the low quality fuels described herein with the combination of a first stage wet oxidation reactor or direct contact boiler and a second stage stoichiometric burner at system design pressures and temperatures which have not heretofore been employed in connection with either wet oxidation reactors or direct contact boilers. The present system effectively uses higher temperatures to completely combust solid waste and the like. Table I below sets forth system design pressures and temperatures for a typical system fuel, that is garbage or municipal solid waste, combusted under two conditions in a wet oxidation reactor-based system. Under the first condition, pure oxygen is supplied to the wet oxidation reactor (12 in FIG. 1) and to the second stage stoichiometric burner (28 in FIG. 1) in a stoichiometric ratio with the fuel. Under the second condition, air is supplied in stoichiometric ratio to the wet oxidation reactor and to the second stage burner with the fuel. Temperatures and pressures are measured in the mixing section (32 in FIG. 1).

TABLE I

| TEMPERATURE (°F.) | 500 | 550 | 600 | 650 | 700 |
|---|---|---|---|---|---|
| Oxygen Pressure (psi) | 745 | 1150 | 1680 | 2400 | 3350 |
| Air Pressure (psi) | 1040 | 1600 | 2350 | 3300 | 4460 |

The combustion process of the present invention effectively combusts a wide range of low quality fuels to produce gaseous combustion products that are usable for power generation. Although garbage and solid waste are the fuels most likely to be used in the process described herein, low quality and high sulfur coal can be efficiently combusted by the present process to produce gaseous combustion products usable for power generation and the like. A number of coal gasification processes has been proposed. However, none of the known processes is based on a wet oxidation reactor to produce gaseous combustion products from coal. The combustion system of the present invention can be effectively modified to gasify coal. In this modified process, a mixture of coal and water is supplied to a wet oxidation reactor, such as reactor 12 in FIG. 1. Controlled amounts of air or oxygen are supplied to the reactor so that combustion of the coal in the wet oxidation reactor is controlled. The second stage stoichiometric burner (28 in FIG. 1) can be eliminated from this coal gasification process, and usable combustion products can be produced at lower temperatures than those at which coal gasification processes are currently conducted.

Additional modifications of the present combustion system which substantially completely combust a low quality fuel or solid waste to produce usable gaseous combustion products are contemplated to be within the scope of the present invention.

Industrial Applicability

The combustion system and method of the present invention will find its primary application in the waste disposal industry where it can be used to substantially completely combust municipal or industrial waste to produce combustion products useful for power generation. The present combustion system will also find applications in the power generating industry where low quality fuels and coal can be substantially completely combusted to produce gaseous power-generating combustion products.

I claim:

1. A method for generating combustible gas from coal, including the steps of (a) supplying coal, water and a source of oxygen at an optimum system pressure and temperature above the saturation temperature corresponding to the partial pressure of the steam present in gaseous products of combustion to a wet oxidation reactor;

(b) maintaining the level of liquid in the wet oxidation reactor at a preselected optimum level to promote oxidation of said coal;

(c) controlling the supply of oxygen so that the combustion of said coal in said wet oxidation reactor at said optimum pressure and temperature is incomplete to produce combustible gaseous products; and (d) cooling said gaseous products and then directing said gaseous products to a storage and distribution system.

2. The method for generating combustible gas described in claim 1, wherein the optimum pressure is 3300 psi when the temperature is 650° F. and 4460 psi when the temperature is 4460 psi.

* * * * *